June 17, 1975 KIYOSHI SANDOW Re. 28,453

HEAT AND SMOKE VENT

Original Filed Oct. 28, 1970

Kiyoshi Sandow
INVENTOR

BY

Prevel Wilson & Matthews
ATTORNEYS

United States Patent

Re. 28,453

Reissued June 17, 1975

28,453

HEAT AND SMOKE VENT

Kiyoshi Sandow, Houston, Tex., assignor to Plasteco, Inc.

Original No. 3,731,442, dated May 8, 1973, Ser. No. 84,577, Oct. 28, 1970. Application for reissue Feb. 4, 1974, Ser. No. 439,054

Int. Cl. E04c *1/02;* E04d *1/30*

U.S. Cl. 52—232 9 Claims

Matter enclosed in heavy brackets [ ] appears in the original patent but forms no part of this reissue specification; matter printed in italics indicates the additions made by reissue.

ABSTRACT OF THE DISCLOSURE

A heat and smoke vent for the roof of a building or other structure having a cover which deforms and disengages from its mounting when heated by a fire in the building notwithstanding rain falling thereon, and thereby automatically releasing the heat and smoke from the building.

BACKGROUND OF THE INVENTION

The field of the present invention is heat and smoke vents for the roof of a building or other structure.

In the past, efforts have ben made to develop heat and smoke vents which automatically opened when heated to certain temperatures to allow heat and smoke to escape from the building during fires. The major problem encountered with such construction occurred during rainy conditions, wherein the rain cooled the vent cover sufficiently to prevent such cover from deforming and falling, with the result that the cover blocked the vent opening and prevented the heat and smoke from escaping, and thus defeated the purpose of the vent construction. A further problem existed because the edges of the cover often did not receive sufficient heat from the fire to soften or deform the edges thereof, whereby the deformed cover was held at its edges, blocking the vent and keeping the heat and smoke from escaping, and again defeating the purpose of the vent construction.

SUMMARY OF THE [INVNTION] *INVENTION*

With the present invention, a shield of plastic, metal or other suitable material insulates at least the upper central portion of the vent cover to prevent rain from cooling the cover, allowing the cover to deform under heat from a fire in the building and to drop from the vent to allow heat and smoke to escape from the building through the vent. The outer edges of the cover are supported by spaced buttons or supports so that heated air flows through the spaces between the supports to soften the edges and permit the sagging and deformed cover to disengage from the vent, opening the vent to allow heat and smoke to escape.

DESCRIPTION OF THE PREFERRED EMBODIMENTS

Figure 1:
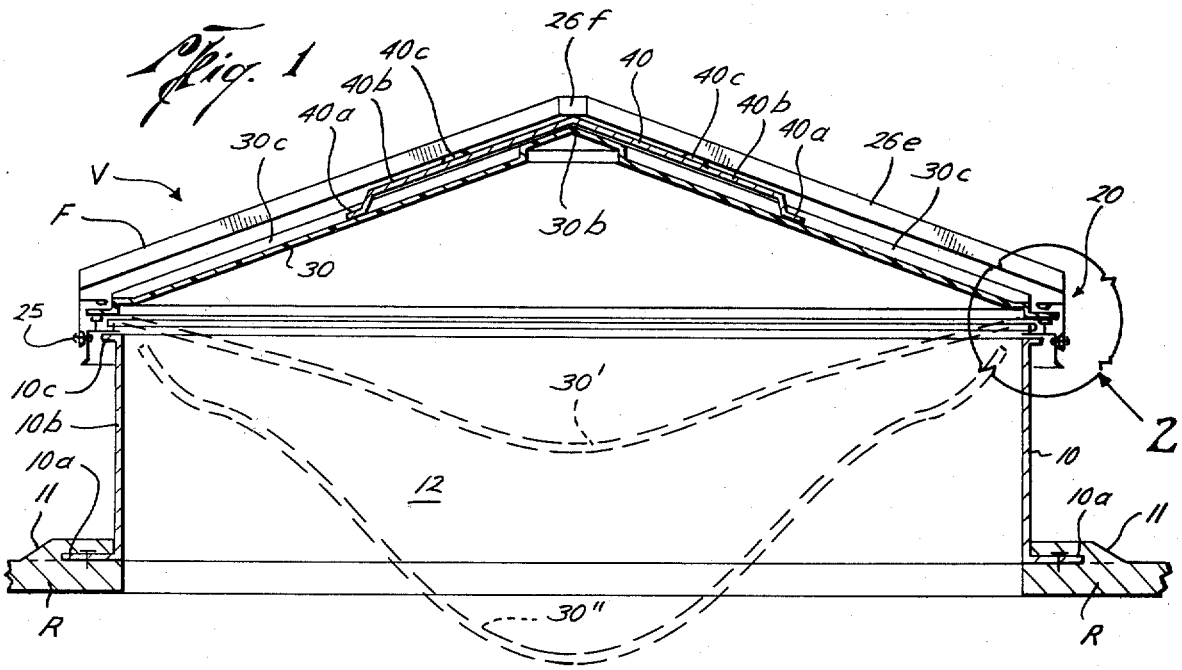
FIG. 1 is a cross-sectional view of the heat and smoke vent of the present invention.

In the drawings, the letter V designates generally the heat and smoke vent of the present invention which covers an opening in a roof R of a building or other structure. Should a fire develop in the building in which the vent V is mounted, the vent V automatically opens under predetermined heat conditions so that heat and smoke from the fire may escape from the building to reduce smoke hazards to firemen and to reduce smoke and heat damage to the building and its contents.

Considering the invention more in detail, the vent V of the present invention includes a curb 10 made of aluminum or other suitable material, extending upwardly from the roof R around the rectangular, square or other shaped vent opening 12. A self-supporting cover 30 which is capable of softening and sagging when subjected to certain heat conditions, and which is preferably pyramid shaped, covers the vent opening 12 and is mounted along an edge 30a to the curb 10 in a manner to be set forth below by a mounting frame 20 (FIG. 2) which includes an inner mounting frame 21 and an outer mounting frame 26.

The mounting frames 21 and 26 are made of extruded aluminum or other suitable material. The deformable cover 30 is made of polyvinyl chloride, vinyl acetate, or other translucent or transparent plastic or synthetic resin to allow sunlight to enter the vent V through the roof R of the building, while keeping rain from entering the building through the vent V.

The curb 10 is generally channel-shaped or C-shaped in cross-section (FIG. 1) and is attached along a substantially horizontally outwardly extending roof flange 10a to the roof R around the periphery of the vent V by nails, screws or other suitable attaching means and extends upwardly therefrom. A sealing coat 11 of asphalt, tar or other suitable sealing substance is applied to the roof R and roof flange 10a to seal the curb 10 and the roof R to prevent leaks.

A side wall 10b extends substantially vertically upwardly from the roof flange 10a around the periphery of the vent V to a substantially horizontally outwardly extending mounting flange 10c. If desired, insulation may be installed adjacent the side wall 10b outside the vent V and held in place against such side wall by suitable means such as flashing or the like to insulate the vent V and the building.

A horizontal mounting member 21a (FIG. 2) of the inner mounting frame 21 is mounted to an upper surface 10d of the mounting flange 10c. An interior wall member 21b extends vertically upwardly from the mounting member 21a and serves as one wall of a condensation gutter 22 for receiving condensation which may develop within the vent V.

A T-shaped support mounting member 21c extending vertically upwardly from the mounting member 21a serves as a second vertical wall for the condensation channel or gutter 22, and further as a support mounting for a plurality of spaced supporting buttons 23 (FIGS. 2 and 2A) made of vinyl resin, plastic or other suitable resilient material. *Aluminum, an art recognized equivalent, may also be a suitable material.* The support buttons 23 are spaced along the support mounting member 21c about the periphery of the vent V with gaps 23a (FIG. 2A) therebetween, and support an edge 30a of the deformable cover 30. Heated air from a fire in the building may pass out of the vent V through the gaps or spaces 23a to warm and soften the edge 30a so that the edge 30a may flex to disengage from the mounting frame 20, as the cover 30 deforms and sags when heated, as will be more evident later.

A vertical weepage wall 21d extends downwardly from the horizontal member 21c and allows rain or other precipitation to move from the top of the cover member 30 through the mounting frame 20 to the roof R for drainage.

The outer frame member 26 is attached to the inner frame member 21, but is spaced therefrom, as will be more evident later, to permit the flow of heated air from below the vent V to warm the edge 30a of the deformable cover 30.

A vertically extending side wall 26a (FIG. 2) extends between the corners of the outer frame member 26, and is secured to the vertical wall 21d by rivets 25 or other fastening means. A plurality of spacing buttons or dimples 26b are formed on the interior surface of the wall member 26a to space such wall member from the vertical wall 21d and the support mounting member 21c, thus forming a drainage and flow space 27.

A horizonally inwardly extending wall section 26c is integral with or is attached to the wall member 26a along the length of such wall member and a plurality of spaced positioning buttons 26d are formed along its lower surface. The buttons 26d assure that the horizontal wall sections 26c are always spaced above the edge 30a of the cover 30, even if temperature changes caused by fire in the building and rain about the vent V cause distortion thereof or changes. By preventing full contact of the sections 26 with the edge 30a, heat transfer resulting in cooling of the edge 30a is minimized. Even the buttons 26d are initially positioned above the edge 30a so that there is no substantial interference with the release of the edge 30a from the frame 20 when it softens, as will be more evident hereinafter.

A protective unit F formed of four guard rails 26e, each of which is secured to each of the corners of the frame member 26 (FIG. 3) is mounted above the corner 30 to provide means to prevent a worker or other person on the roof R from inadvertently falling completely through the vent V. Should a person fall into the cover 30, he may grasp one or more of the protective guard rails 26e with his arm, hand or leg to prevent himself from falling completely through such cover 30.

The cover member 30 is mounted along the edge 30a around its periphery on the spaced support buttons 23 beneath the spacing buttons 26d. The cover member 30 is preferably in the form of a pyramid, with an apex or pinnacle 30b of the pyramid beneath the center junction 26f of the guard rails 26e.

A plurality of raised ribs 30c are formed in the cover member 30, extending from the corners to the center 30b, preferably beneath the protective rails 26e to increase the strength of the cover 30, which is capable of withstanding a live load of at least forty pounds per square foot under normal weather and temperature conditions.

A shield 40 made of metal, plastic or other suitable material is mounted with the cover member 30 and covers and insulates at least the upper central portion about the apex 30b thereof so that rain falling at a rate of one-half inch per hour does not cool the cover member 30 sufficiently to prevent such cover member 30 from deforming and falling completely out of the frame 20 in no more than 5 minutes, under the following test conditions, which conditions are representative of actual circumstances occurring in practice:

a. First 2 minutes at about 430° F.; and
b. Next 3 minutes at about 530° F.

The shield 40 has a depending supporting edge surface 40a which supports the shield 40 with the upper surface of the cover 30 with a space between the major body portion 40b and the cover 30. The shield 40 is not connected to such cover 30, but is floating so that it provides no rigidifying effect to the cover 30. The space between the body portion 40b and the cover 30 is important in that it provides an insulation which reduces heat transfer and cooling of the cover 30 when the shield 40 is cooled by the falling rain. The raised ribs 30c also extend under the shield 40. A plurality of bumps or dimples 40c may be formed in the shield 40 to engage the protective rails 26e to prevent undesirable movement of the shield 40 with respect to the cover 30 and rails 26e due to wind and the like.

The lack of any fixed connection between the shield 40 and cover member 30 prevents the shield 40 from stiffening and supporting the cover member 30 as such member is softening and deforming from its normal or undeformed condition (as indicated by solid lines in FIG. 1).

In the use of the vent V of the present invention, when a fire breaks out in the building, heated air from such fire will rise from the building into the opening 12 in the vent V. The heated air warms the cover 30 causing such cover to soften and deform while the shield 40 will prevent rain from cooling the cover 30 which might otherwise prevent such cover from softening and deforming.

A portion of the heated air passes from the opening 12 through the channel 22 and the gaps 23a between the support buttons 23 into the pocket 27 and from the pocket 27 past the space between the buttons 26b and/or 26d out of the vent V, warming the edge 30a of such cover 30 enough to also soften same.

As the cover 30 and its edge 30a soften, such cover 30 will sag or drop downwardly as indicated by the dotted line positions 30' and 30'' in FIG. 1, with the edge 30a disengaging from the mounting frame 20, allowing the cover 30 to drop from the vent V to open the vent V so that the heat and smoke may escape from the building.

Figure 2:
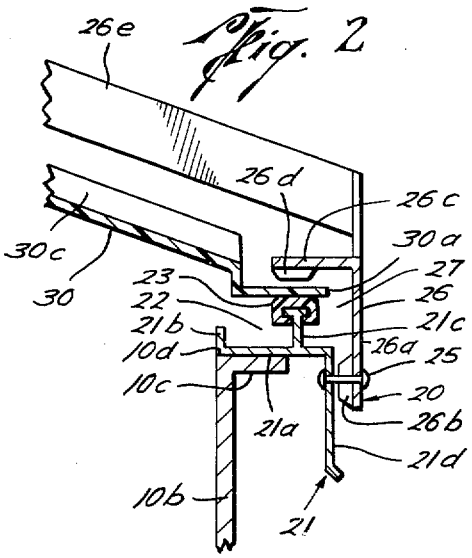
FIG. 2 is a sectional view illustrating in detail the portion circled and having the reference numeral "2" designating same in FIG. 1.
Figure 2A:
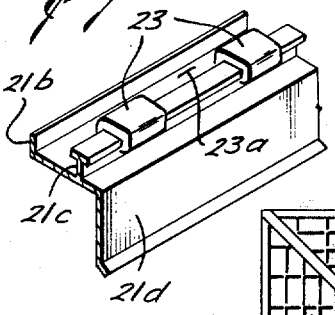
FIG. 2A is an isometric view of the spaced buttons of FIG. 2 supporting the edges of the vent cover.
Figure 3:
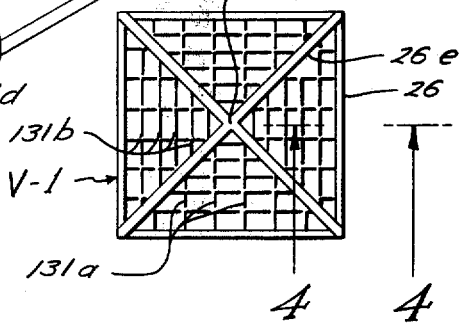
FIG. 3 is a plan view of an alternative embodiment of the heat and smoke vent of the present invention.
Figure 4:
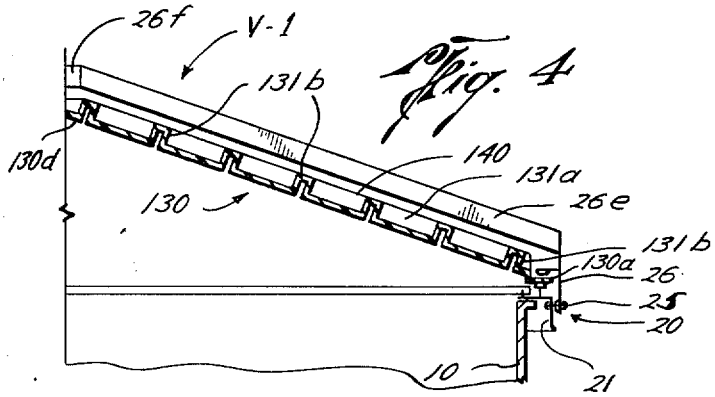
FIG. 4 is a cross-sectional view taken along the line 4—4 of FIG. 3.

In FIGS. 3 and 4, an alternative vent V–1 is illustrated, wherein like parts have the same referenced numerals or letters as the vent V in FIGS. 1 and 2.

The cover 130 is self-supporting and is also preferably pyramid-shaped as is the cover 30, and it is made of polyvinyl chloride or other suitable transparent or translucent material, which is capable of softening and sagging when subjected to the foregoing test conditions. The cover 130 has an edge 130a supported by mounting frame 20 of like construction to that of the vent V. The cover 130 differs from the cover 30 in that it has a waffle-like pattern of raised ridges 131 formed therein. The ridges 131 preferably include longitudinal ridges 131a and lateral ridges 131b (FIG. 4) which form the waffle pattern, although other patterns and arrangements of the ridges 131 may be provided.

A shield 140, formed of a film or thin sheet of plastic or other suitable material is mounted atop and covers the ridges 131 in whatever pattern is used for supporting same. The shield 140 is preferably not fixedly attached or affixed to the cover 130, and is thin enough so that it is not self-supporting. The shield 140 should be thin enough so that even if it is bonded at its lower edges to the cover 130 or elsewhere, it will not serve to rigidify the cover 30 or interfere with the sagging and falling of the cover 130 when it softens under the temperatures set forth above in the test conditions.

The shield 140 is spaced from the major portion of the cover 130 by the ridges 131a and 131b so as to provide air insulation spaces above the cover 130 to prevent rain from cooling the cover 130 when it is subjected to heat from a fire in the building, whereby the cover 130 is released from the frame 20 by softening and deforming and disengaging from the frame 20 in the same manner illustrated and described in FIG. 1.

It should be understood that the partial shield 40 of the vent V may be extended so as to be a full shield as is the shield 140 if desired. Also, the shield 140 of the vent V–1 may be only a partial shield, but if only partial, a pattern of the ridges 131 other than the waffle pattern will be used to prevent collecting rain water between the uncovered ridges. For example, only the longitudinal ridges 131a may be utilized in such a case.

The foregoing disclosure and description of the invention are illustrative and explanatory thereof, and various changes in the size, shape and materials as well as in the details of the illustrated construction may be made without departing from the spirit of the invention.

I claim:

1. A vent for heat and smoke adapted to be mounted on a roof of a building or like structure, comprising:

a. a curb adapted to be mounted on a roof and having a vent opening therethrough;

b. a heat softenable translucent or transparent synthetic resinous plastic vent cover means which is capable of softening and sagging when heated under predetermined conditions for sagging and dropping out of the vent opening to open same and allow heat and smoke to escape through the vent from the area in the building therebelow;

c. mounting means for releasably mounting said vent cover means on said curb; and d. a shield disposed over only the central portion of said vent cover and insulating same from cooling by rain falling thereon, thereby allowing the vent cover to soften and deform under said predetermined heating conditions so as to automatically disengage said cover from said mounting means for opening the vent to allow heat and smoke to escape.

2. The structure set forth in claim 1, wherein:

said predetermined conditions under which said cover softens and sags includes heat in the vent for a period of two minutes at about 430° F., and for a further period of three minutes at about 530° F., while rain is falling on the vent at a rate of about one-half inch per hour, with the cover completely releasing from said mounting means in not more than 5 minutes under such conditions.

3. The structure of claim [2] *1*, wherein:

said shield is [read-] supported on *said vent cover* but is unattached thereto to prevent rigidifying of said vent cover which might interfere with the sagging of said cover when it softens and deforms to disengage from said mounting means.

4. The structure of claim [3] *1*, wherein:

a. said vent cover has a pyramid shape when in its normal undeformed condition; and b. said shield extends over the upper central portion of said pyramid-shaped vent cover.

5. The structure of claim [4] *1*, further including:

protective guard means mounted with said vent cover for catching a person who might otherwise inadvertently fall through said vent cover.

6. The structure of claim [7] *1*, wherein:

a. said shield comprises a flexible sheet covering said vent cover but which is so thin that it is not self-supporting but which is capable of deflecting falling rain; and b. ridges formed in said vent cover for supporting said shield in spaced relationship thereto.

7. The structure set forth in claim 6, wherein: said ridges are in a waffle pattern.

8. A vent for heat and smoke adapted to be mounted on a roof of a building or like structure, comprising:

a. a curb adapted to be mounted on a roof and having a vent opening therethrough;

b. a heat softenable translucent or transparent synthetic resinous plastic vent cover means which is capable of softening and sagging when heated under predetermined conditions for sagging and dropping out of the vent opening to open same and allow heat and smoke to escape through the vent from the area in the building therebelow;

c. mounting means for releasably mounting said vent cover means on said curb; and d. said mounting means including vent cover support means disposed along the upper surface of said curb with peripheral spaces therebetween for supporting the edge of said vent cover at spaced points only to thereby provide flow passages along the edge of said cover for heat coming upwardly through the vent opening to thereby assure the warming and softening of the edge of said cover to disengage and release same from said mounting means when said vent cover sags.

9. The structure of claim 8, wherein said vent cover support means includes:

a plurality of supporting buttons mounted with and spaced along the periphery of said inner frame means to support said vent cover, and allowing the heated air to escape from the building through the spaces between said supporting buttons to warm said edges of said vent cover, allowing said vent cover to deform and disengage from said vent.

References Cited

The following references, cited by the Examiner, are of record in the patented file of this patent or the original patent.

UNITED STATES PATENTS

| | | | |
|---|---|---|---|
| 2,803,318 | 8/1957 | Hickerson | 49—7 |
| 1,032,012 | 7/1912 | Martin | 52—82 |
| 1,063,068 | 5/1913 | Rose | 98—86 |
| 2,122,530 | 7/1938 | McDerment | 98—42 |
| 2,968,263 | 1/1961 | Huston et al. | 52—200 |
| 3,036,406 | 5/1962 | Wasserman | 52—64 |
| 3,399,500 | 9/1968 | Shapiro | 52—72 |
| 3,557,497 | 1/1971 | Schafer et al. | 52—72 |

FOREIGN PATENTS

| | | | |
|---|---|---|---|
| 797,208 | 6/1958 | Great Britain | 52—625 |

FRANK L. ABBOTT, Primary Examiner

J. L. RIDGILL, Jr., Assistant Examiner

U.S. Cl. X.R.

49—7; 52—200